US006698136B1

(12) United States Patent
Cleveland

(10) Patent No.: US 6,698,136 B1
(45) Date of Patent: Mar. 2, 2004

(54) MULTI-COMPARTMENT PLANTER FOR GROWING PLANTS FROM SEEDS OR SEEDLINGS

(76) Inventor: Grant Cleveland, 616 Falls Rd., Chagrin Falls, OH (US) 44022

( * ) Notice: Subject to any disclaimer, the term of this patent is extended or adjusted under 35 U.S.C. 154(b) by 0 days.

(21) Appl. No.: 10/167,967

(22) Filed: Jun. 10, 2002

(51) Int. Cl.$^7$ ................................. A47G 7/00
(52) U.S. Cl. ........................................ 47/39
(58) Field of Search ................................ 47/65.5, 66.1, 47/66.5, 66.6, 66.7, 68, 71, 75, 77, 82, 83, 86, 87, 39, 1.01 R, 85

(56) References Cited

U.S. PATENT DOCUMENTS

| | | | | |
|---|---|---|---|---|
| D127,441 S | * | 5/1941 | Jorgensen | D11/152 |
| D139,569 S | * | 11/1944 | O'Brien | D32/53 |
| 3,142,133 A | | 7/1964 | Brooks | |
| 3,810,329 A | | 5/1974 | Lecuru et al. | |
| 3,872,621 A | * | 3/1975 | Greenbaum | 47/87 |
| D239,129 S | | 3/1976 | Rosenberger et al. | |
| 4,076,490 A | * | 2/1978 | Hilker | 431/125 |
| 4,196,542 A | * | 4/1980 | West | 47/4 |
| 4,349,293 A | | 9/1982 | Rosenberger | |
| 4,586,288 A | | 5/1986 | Walton | |
| 4,614,056 A | * | 9/1986 | Farkas | 47/67 |
| 4,644,686 A | * | 2/1987 | Whitman | 47/71 |
| 4,658,542 A | | 4/1987 | Holmberg | |
| 4,685,246 A | | 8/1987 | Fennell | |
| 4,779,378 A | | 10/1988 | Mason, Jr. | |
| 4,793,097 A | | 12/1988 | Whitcomb | |
| 4,800,675 A | * | 1/1989 | Feil et al. | 47/33 |
| 5,161,710 A | | 11/1992 | Chumley | |
| 5,228,229 A | * | 7/1993 | Lindgren | 47/39 |
| D349,615 S | | 8/1994 | McLaughlin | |
| 5,345,712 A | | 9/1994 | Lambert | |
| 5,379,550 A | | 1/1995 | Beljaars | |
| 5,393,313 A | * | 2/1995 | Reiger | 47/58.1 R |
| 5,407,470 A | * | 4/1995 | Jutzi | 96/121 |
| 5,419,080 A | | 5/1995 | Buss et al. | |
| 5,438,796 A | | 8/1995 | Nathan | |
| 5,444,940 A | * | 8/1995 | White-Wexler et al. | 47/82 |
| 5,501,040 A | | 3/1996 | White-Wexler et al. | |
| 5,511,342 A | * | 4/1996 | Maso | 47/83 |
| 5,533,302 A | | 7/1996 | Lynch et al. | |
| 5,577,344 A | * | 11/1996 | Zaremba et al. | 47/39 |
| 5,664,370 A | | 9/1997 | Boudreau et al. | |
| 5,881,503 A | | 3/1999 | Eichelberger | |
| 5,960,587 A | | 10/1999 | Brasseur, Jr. et al. | |
| 6,105,307 A | * | 8/2000 | Helmy | 47/33 |
| 6,161,333 A | | 12/2000 | Poston | |
| 6,205,709 B1 | | 3/2001 | Diloreto et al. | |
| 6,219,967 B1 | | 4/2001 | Powell | |
| 6,266,921 B1 | | 7/2001 | Keskilohko | |
| 6,339,902 B1 | | 1/2002 | Holmberg | |

FOREIGN PATENT DOCUMENTS

DE          4211322 A1  *  10/1993  ............ A01G/9/02

* cited by examiner

Primary Examiner—Charles T. Jordan
Assistant Examiner—Francis T. Palo

(57) ABSTRACT

A planter having a base and a plurality of compartments integrally formed with the base and projecting upwardly from the base. Interior walls of each compartment and a portion of the base enclosed by the interior walls of each compartment define a receptacle for receiving a plant growing medium and for propagating a plant therein. The base extends laterally beyond each of the compartments.

30 Claims, 2 Drawing Sheets

MULTI-COMPARTMENT PLANTER FOR GROWING PLANTS FROM SEEDS OR SEEDLINGS

TECHNICAL FIELD

The present invention relates generally to planters for the propagation of vegetation and, more particularly, to a planter having a plurality of compartments used to grow plants from seeds or seedlings.

BACKGROUND

Many horticultural hobbyists use planters to propagate plants from seeds or seedlings. For some plant species, growing a plant to a somewhat mature state (e.g., a transplantable state) from a seed or seedling can take a very long time. For example, some cactus species started from a seed or a seedling can take up to about ten years to reach a height of approximately one inch. Other cactus species can take about ten months to grow to a height of about two inches. As one skilled in the art will appreciate, such results will vary depending on the plant species, environmental conditions such as temperature, moisture, soil type, sunlight, and so forth. In addition, a certain percentage of seeds typically do not germinate (such percentage depending on the plant species and environmental conditions). Furthermore, seeds that do germinate and existing seedlings may not survive to reach a mature state.

Currently, the state of the art for devices used to propagate plants from seeds or seedlings consists of trays having multiple chambers in which soil is placed along with the seeds or seedlings. The chambers typically protrude downward from a planar surface. The trays are typically not very decorative or aesthetically appealing. The trays are also typically used for plant species that germinate and grow to a transplantable state in a relatively short period of time (e.g., about a few weeks up to about a few months).

Accordingly, there exists a need in the art for a planter that can be used to start plants from seeds or seedlings and that has features that would make use of the planter appealing for starting slow propagating plants while displaying the planter in a location such as, for example, a window sill.

SUMMARY OF THE INVENTION

The present invention involves a planter for growing plants.

According to one aspect of the invention, the planter includes a base and a plurality of compartments integrally formed with the base and projecting upwardly from the base. Interior walls of each compartment and a portion of the base enclosed by the interior walls of each compartment define a receptacle for receiving a plant growing medium and for propagating a plant therein. The base extends laterally beyond each of the compartments.

According to another aspect of the invention, the planter includes a base portion having a front portion and a rear portion and a plurality of compartments disposed on the base portion, wherein the compartments upwardly project from the base and increase in height from the front portion of the base portion to the rear portion of the base portion.

BRIEF DESCRIPTION OF DRAWINGS

These and further features of the present invention will be apparent with reference to the following description and drawings, wherein.

DISCLOSURE OF INVENTION

Figure 1:
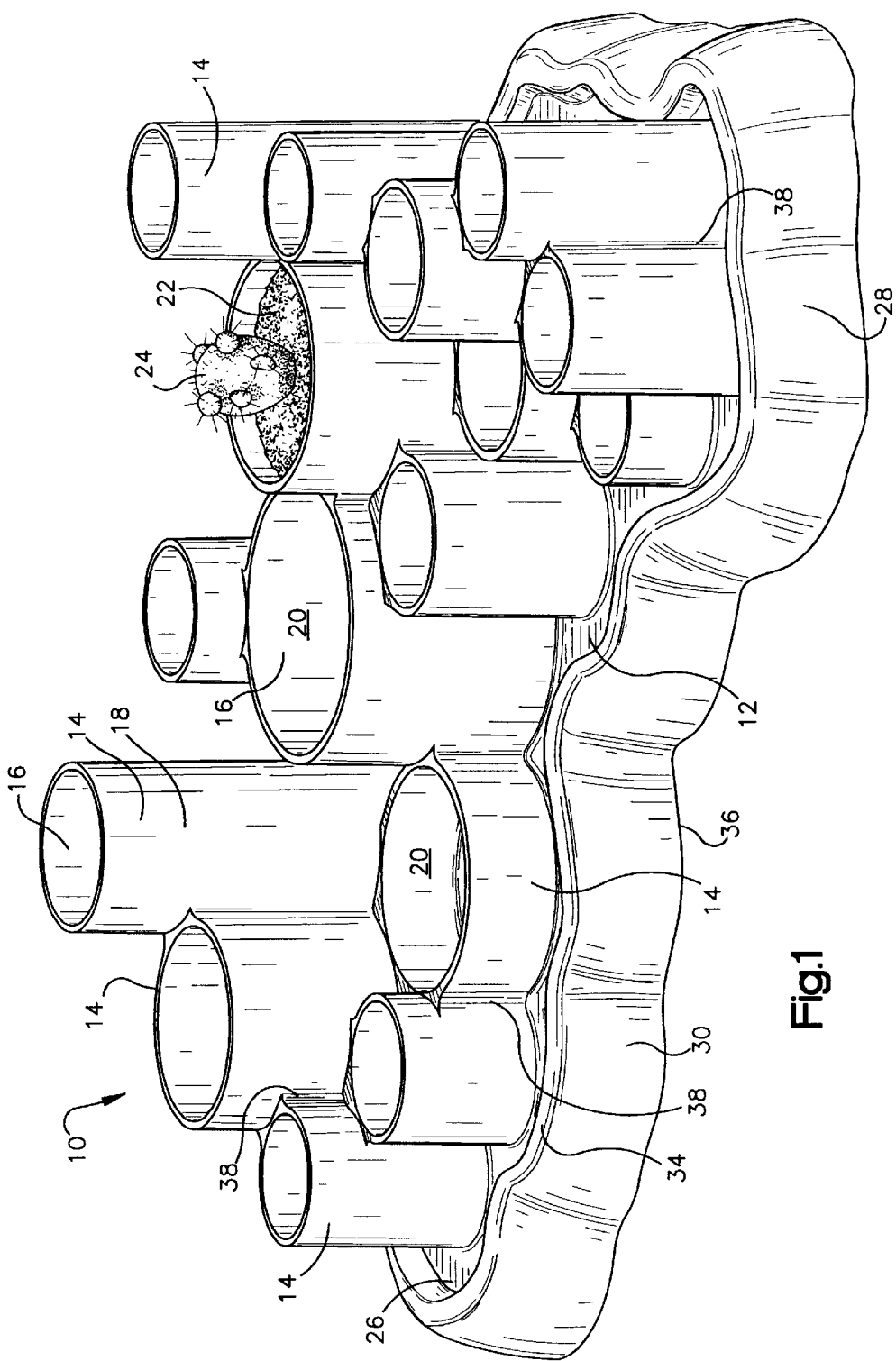
FIG. 1 is a front-right perspective view of an example planter according to the present invention.

In the detailed description that follows, similar components have been given the same reference numerals, regardless of whether they are shown in different embodiments of the present invention. To illustrate the present invention in a clear and concise manner, the drawings may not necessarily be to scale and certain features may be shown in somewhat schematic form.

Referring to FIG. 1, a planter 10 is illustrated. The planter 10 includes a base upon which a plurality of containers, or compartments 14, are disposed. In the illustrated embodiment, each compartment 14 comprises a hollow cylinder with an open top that extend upwardly from a top surface of the base 12 to a desired height. Although the compartments 14 are illustrated as cylinders, one skilled in the art will appreciate that the compartments can have any geometric shape, such as having a circular cross-section, an oval cross-section, a triangular cross-section, a square cross-section, and so forth. In addition, interior walls 16 and/or exterior walls 18 of the compartments 14 need not be vertical. For example, the compartments 14 can be bowl-shaped, cone-shaped, frustum-shaped and so forth. Therefore, the illustrated cylindrical shape of the compartments 14 is exemplary.

Figure 3:
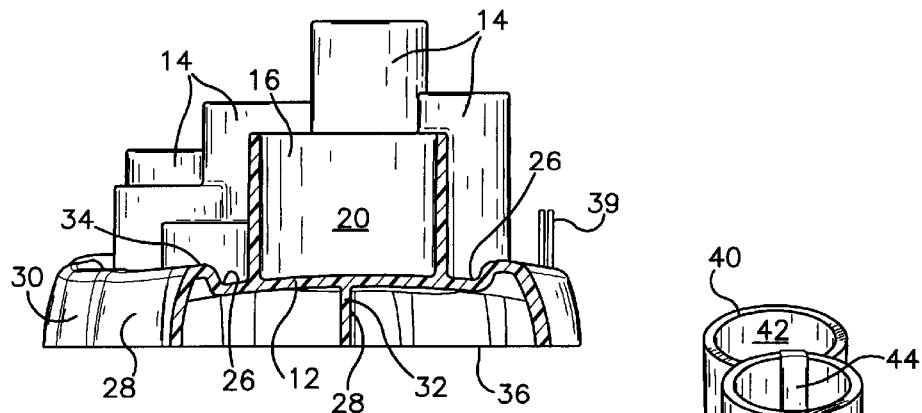
FIG. 3 is a cross-sectional view of the example planter taken along the line 3—3 of FIG. 2.

With additional reference to FIG. 3, the base 12 forms a bottom wall for each of the containers 14. In one embodiment, no drainage holes or other type of moisture weeping mechanism is provided in the base 12 or in the compartments 14. In another embodiment, drainage holes or weep holes can be provided. In yet another embodiment, a detachable cover can be provided to act as a "greenhouse" that traps heat and/or moisture around the planter 10.

Figure 2:
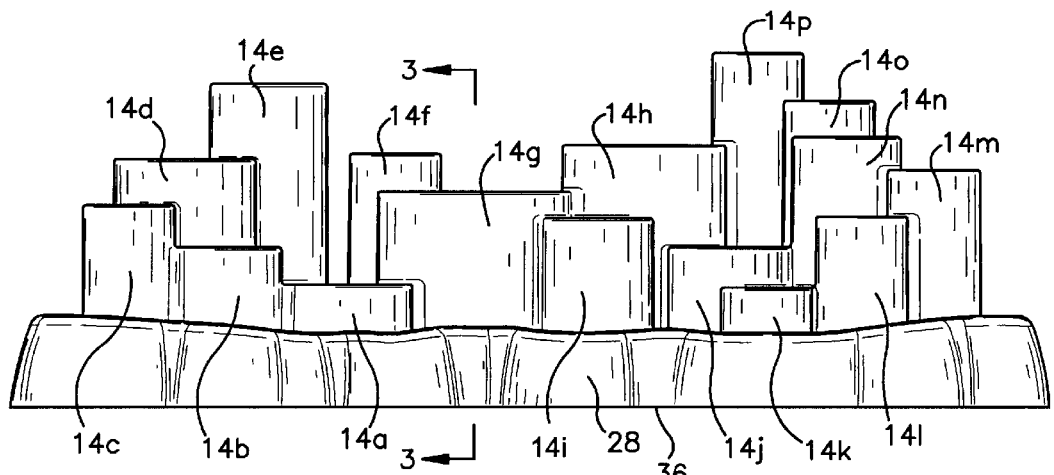
FIG. 2 is a front elevational view of the example planter.

With continued reference to FIGS. 1–3, the compartments 14 each have an interior wall 16 and an exterior wall 18. In one embodiment of the planter 10, each exterior wall 18 is disposed directly against (e.g., is in engagement with) at least one other exterior wall 18 such that each compartment is in "contact" with or is "conjoined" with at least one other compartment 14. As a result, the exterior walls 18 of each compartment 14 may not define a uniform geometrical pattern. In one example, fillets 38 are used form rounded inside corners between adjacent compartments 14 to smooth the junction of one exterior wall 18 to another exterior wall 18. However, in the illustrated embodiment, the interior wall 16 defines a uniform geometrical pattern when viewed in cross-section to the longitudinal axis (i.e., the vertical axis) of the compartment 14.

Each compartment 14 defines a receptacle 20 for receiving a plant growing medium (e.g., soil), a seed (or seeds), a seedling (or seedlings), water, plant fertilizer, and so forth. FIG. 1 illustrates one of the compartments 14 having soil 22 disposed therein and a relatively small plant 24 growing in the soil 22. In the illustrated embodiment, the plant 24 is a cactus which has been propagated from a cactus seed.

Each receptacle 20 is defined by the interior walls 16 of the compartments 14 and a portion of the upper surface of the base 12 that is enclosed by the interior walls 16. The base 12 is common to all of the receptacles 20 and defines a bottom wall of each receptacle 20. The base 12 is continuous and has an area which is larger than the aggregate cross-sectional areas of each of the compartments 14. Accordingly, a perimeter 26 of the base 12 laterally extends beyond each compartment 14. As illustrated, the base 12 can be supported by support members 28 such that the base 12 is raised over a surface (not shown) upon which the planter 10 may be placed. The support members 28 can include a perimeter support member 30 that extends around the perimeter 26 of the base 12 in a continuous fashion to shield an observer's view from seeing under the raised base 12. The support member 28 can also include internal support members 32 for providing additional subjacent support for the base 12 and compartments 14 disposed thereon.

The perimeter support member 30 can be joined to the perimeter 26 of the base 12 by an upwardly projecting shoulder, or lip 34. As will be discussed in greater detail below, the lip 34 and other features of the planter 10 combine to impart a natural and interesting appearance to the planter 10. In addition, the lip 34 can function to retain water and/or soil that does not make its way into the receptacles 20. In addition, soil or other material (e.g., sand, small pebbles, colored pellets and the like) can be intentionally placed on the base 12 between the lip 34 and the exterior walls 18 of the compartments 14 to enhance the appearance of the planter 10.

In one embodiment of the planter 10, the base 12 can be elevated by the support members 28 to a height ranging from about 0.25 inches to about 0.75 inches as measured from a bottom edge 36 of the support members 28. The bottom edges 36 of each support member 28 are generally disposed in a plane. In addition, the compartments 14 can have a variety of heights. For example, the compartments 14 can upwardly extend from the base 12 a distance of about 0.25 inches to about three inches. In one embodiment of the planter 10, no two compartments 14 have the same height. In other embodiments, select pairs or groups of compartments 14 have approximately the same height.

In the illustrated embodiment of the planter 10 and as best illustrated in FIG. 2, there are sixteen compartments (identified by reference numbers 14a–14p) where each compartment 14 varies in height and diameter (as defined by the interior wall 16). Accordingly, the volume of each receptacle 20 can also vary from compartment 14 to compartment 14. For each exemplary compartment 14a through 14p, table 1 identifies a height as measured from the bottom edge 36 of the support members 28 to a top edge of each compartment 14, the diameter of each receptacle 20 as defined by the interior wall 16 of each compartment 14, and a volume of each receptacle 20 (where it is assumed that the base 12 is disposed approximately 0.5 inches from the bottom edge 36 of the support members 28).

TABLE 1

| Compartment | Height (from bottom edge 36) (inches) | Internal Diameter (inches) | Volume (of corresponding receptacle 20) (cubic inches) |
|---|---|---|---|
| 14a | 0.77 | 0.91 | 0.18 |
| 14b | 1.00 | 0.51 | 0.10 |
| 14c | 1.25 | 0.46 | 0.12 |
| 14d | 1.55 | 0.76 | 0.48 |
| 14e | 2.05 | 0.61 | 0.45 |
| 14f | 1.60 | 0.46 | 0.18 |
| 14g | 1.35 | 1.11 | 0.82 |

TABLE 1-continued

| Compartment | Height (from bottom edge 36) (inches) | Internal Diameter (inches) | Volume (of corresponding receptacle 20) (cubic inches) |
|---|---|---|---|
| 14h | 1.65 | 0.91 | 0.75 |
| 14i | 1.20 | 0.54 | 0.16 |
| 14j | 1.00 | 0.71 | 0.20 |
| 14k | 0.75 | 0.51 | 0.05 |
| 14l | 1.20 | 0.46 | 0.12 |
| 14m | 1.50 | 0.46 | 0.17 |
| 14n | 1.70 | 0.56 | 0.30 |
| 14o | 1.95 | 0.46 | 0.24 |
| 14p | 2.25 | 0.46 | 0.29 |

In one embodiment of the invention, the compartments 14 are cylindrical and have a diameter defined by the interior walls 16 of about 0.3 inches to about 1.5 inches. In addition, the volume of the receptacles 20 (as defined by an upper surface of the base 12 and the interior walls 16) can be about 0.5 cubic inches to about two cubic inches. In one embodiment, the lip 34 can have a height extending upward from the perimeter 26 of the base 12 of about 0.125 inches to about 0.5 inches.

It is noted that the planter 10 is described in the context of growing plants from seeds or seedlings. Therefore, the physical dimensions of the planter 10 are described as being relatively small. It should be noted that the invention is not limited in scope and a larger planter 10 can be constructed in accordance with other features of the present invention.

In the embodiment of the planter 10 as illustrated in FIG. 1, the upper edge of the lip 34 is generally planar (i.e., disposed within a plane drawn generally parallel to the bottom edges 36 of the support members 28). In this embodiment, the base 12 can also be generally planar or slightly curved (e.g., having a convex shape as shown in FIG. 3). In an alternative embodiment, the lip 34 and/or the base 12 can be undulated (e.g., flowing with a light rise and fall) so as to provide a more interesting appearance. For example, the undulation can result in an upper edge of the lip 34 having a height measured from the bottom edges 36 of the support members 28 that, in one embodiment, ranges from about 0.25 inches to about 0.75 inches, and in one embodiment, ranges from about 0.375 inches to about 0.625 inches. The lip 34, whether undulated or not, assists in providing a landscaped appearance to the planter 10.

The planter 10 can be integrally molded to form a unitary piece. For example, the planter 10 can be injection molded using any suitable polymer as is known in the art, such as polystyrene, alkyl benzene, sulfonate (ABS), polyethylene, polypropylene, or the like and any copolymers thereof. Other techniques for fabricating the planter 10 are contemplated. For example, the planter 10 can be blow molded as one piece or can be assembled from multiple pieces. When assembled from multiple pieces the base 12, support members 28 and, if present, the lip 34 can be molded from one piece and the compartments 14 can be extruded or molded and then secured to the base using, for example, an adhesive or fusing technique.

The planter 10 can be provided with a variety of visual appearances by changing the color of the planter 10 or components thereof. For example, the planter 10 can be molded from a clear or translucent material. Alternatively, the planter 10 can be molded from a colored material, such as green, red, brown and so forth. In another embodiment, the planter can be made from glow-in-the-dark material. In one embodiment, the base 12 can be molded from one color and the compartments 14 can be formed from the same color as the base or a different color. In addition, the compartments 14 can be formed from a variety of colors. In one embodiment, the planter 10 is given a mottled, terra-cotta appearance by molding the planter 10 from a terra-cotta colored polymer (e.g., a brownish-red or yellowish-red color often found on fired clay or earthenware). Thereafter, the planter 10 can be painted with one or more colors using a sprayer that randomly mists droplets of paint onto the planter 10. Colors for those paints can include, for example, a cream color, a brown color, a red color, a green color, and so forth.

As indicated, the receptacles 20 are not provided with a drainage mechanism. Under normal circumstances, water and liquids can be removed from the open upper end of the compartments 14 (e.g., by evaporation, physical removal, etc.) or absorption by a plant (e.g., the cactus plant 24), but water and liquids do no move (e.g., seep, drain, etc.) out of the receptacles through the compartment 14 walls or the base 12. Therefore, the receptacles 20 are considered to be water tight.

Also as indicated above, each receptacle 20 has a relatively small volume, such as, in one embodiment, less than about two cubic inches, and, in one embodiment, less than about one cubic inch. Such a volume is useful for starting plants from seed or seedlings. Once the plants achieve a somewhat mature state, the plants can be transplanted to a larger container or into the ground as part of exterior landscaping. In addition, such a volume is useful for keeping plant species small, or smaller than the plant species normal potential since most plants conform to the environment in which they grow.

The features of the planter 10 combine to give the planter 10 an interesting appearance so a hobbyist would feel comfortable displaying the planter 10 even when plants are grown from seed or seedlings that take a relatively long period of time to reach a transplantable state (e.g., more than about one year) and the planter 10 may not contain much viewable plant material. Many cactus plants fall within the category of plants that can take a relatively long time to mature and reach a transplantable state. The combinations of features which make the planter attractive for such a purpose include, for example, the compartments 14 of various heights and diameters, the base 12 which has a perimeter 26 that extends beyond each of the compartments 14, the lip 34 (if present), the undulations of the lip 34 and/or the base 12 (if present), the arrangement of the compartments 14 on the base 12 (including, for example, each exterior sidewall 18 of the compartments 14 being cojoined with at least one other exterior wall 18).

Another feature of the planter 10 can include a "theater" style arrangement. More specifically, as the compartments 14 progress from a front portion of the planter 10 to a rear portion of the planter 10, the compartments 14 can increase in height. As illustrated, the increase in height need not be uniform. However, when the planter 10 is viewed along generally any cross-section (for example, the cross-section of FIG. 3), the compartments 14 increase in height from the front of the planter 10 to the rear of the planter 10. In addition, the planter 10, and particularly the base 12, can be shaped as an arcuate section. That is, the front portion forms a radially inner portion and the rear portion forms a radially outer portion. The arcuate form provides an additional "theater" arrangement to the receptacles. In other embodiments, the compartments 14 can have randomly arranged heights. Alternatively, the compartments 14 can increase in height as the compartments 14 progress from the perimeter 26 of the base 12 to a center of the base 12.

Another feature of the planter 10 can include a "mesa" or "island" style arrangement. More specifically, the base 12 can have a non-regular geometry. In the illustrated example, the base 12 has an overall kidney-shaped geometry when view from above (the kidney-shape falling within the meaning of the term arcuate). In other embodiments, the base 12 can have an overall shape that is round, ovoid, triangular, square, rectangular, etc. In the illustrated embodiment, the non-regular geometry of the base 12, the raising of the base 12 with the support members 28 and the perimeter support member 30 that forms a "curtain" around the base 12 contribute to forming the "mesa" or "island" configuration. It is noted that the perimeter support member 30 can have a beveled inclination or can be vertically disposed.

Another feature of the planter 10 can include tabs 39 (e.g., pairs of upwardly extending projections) connected to, for example, the base 12 or the lip 34. The tabs 39 can be used to retain a piece of sheet material (e.g., cardboard) (not shown) having scenery of other indicia printed thereon. Alternatively, the sheet material can be provided with tabs that fit into notches or holes formed in the base 12, the lip 34 or an upwardly projecting member.

The surfaces of the planter 10 can be provided with a smooth surface or with a textured surface.

Figure 4:
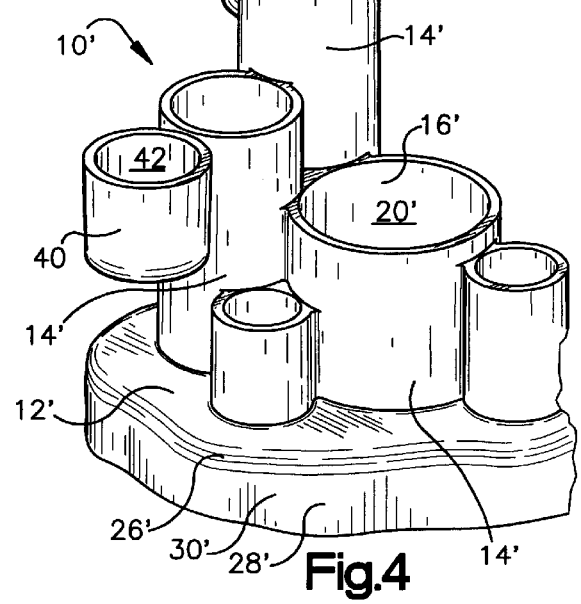
FIG. 4 is a partial perspective view of another example planter according to the present invention.

Referring now to FIG. 4, a partial perspective of a planter 10' that includes alternative features and arrangements is shown. The planter 10' includes a base 12' supported by support members 28'. The base 12' can be provided with undulations or can be generally planar. In the illustrated embodiment of the planter 10', the planter 10' does not have a lip 34 (FIGS. 1–3). Accordingly, the base 12' has a perimeter 26' that joins with the perimeter support member 30' in a radiused fashion or at a right angle.

Similar to the planter 10 of the embodiments illustrated in FIGS. 1–3, the planter 10' has compartments 14' that extend upwardly from the base 12'. Interior walls 16' of the compartments 14' and the base 12' form receptacles 20' which are used to receive a plant growing medium (e.g., soil), a seeds or seedling, water, plant food, and the like.

The planter 10' can include one or more hanging compartments 40, or elevated planter. The hanging compartments 40 are attached to at least one of the compartments 14'. The hanging compartments 40 are similar to the compartments 14' in that they define a receptacle 42 for receiving a plant growing medium (e.g., soil), a seed or seedling, water, plant food, and the like. However, each hanging compartments 40 includes a bottom wall separate from the base 12'.

Each hanging compartment 40 is attached to at least one of the compartments 14' such that the bottom wall of the hanging compartment 40 is spaced above (e.g., elevated above) the base 12'. The hanging compartment 40 can be secured to the compartment 14' by any of a variety of techniques. Such techniques include, for example, adhesive, fusing the hanging compartment 40 to the compartment 14', molding the hanging compartment 40 with the compartment 14', etc. In addition, mechanical fastening means can be used to connect the hanging compartment 40 to the compartment 14'. Mechanical attachment means can include, for example, rivets, screws, tacks, and so forth.

In the illustrated embodiment, each hanging compartment 40 is provided with a projection 44 that can be inserted into an opening in the wall of the compartment 14' so that the compartment 40 is held in engagement with the compartment 14' by a snap fit, an interference fit, a friction fit, or the like, depending on the configuration of the projection 44 and the corresponding opening or slot formed in the compartment 14'.

Although particular embodiments of the invention have been described in detail, it is understood that the invention is not limited correspondingly in scope, but includes all changes, modifications and equivalents coming within the spirit and terms of the claims appended hereto.

What is claimed is:

1. A planter comprising:
   a base; and,
   a plurality of compartments, each compartment integrally formed with said base and rigidly attached thereto to form a unified planter assembly, wherein each compartment projects upwardly from said base, wherein interior walls of each compartment and a portion of said base continuously enclosed by the interior walls of each compartment define an open top receptacle with an interior space completely surrounded by the interior side walls, each receptacle for receiving a plant growing medium and for propagating a plant therein.

2. The planter, as set forth in claim 1, wherein at least one said receptacle is watertight.

3. The planter, as set forth in claim 1, wherein said base extends laterally beyond each of the compartments.

4. The planter, as set forth in claim 3, further including at least one appearance enhancing material disposed upon a portion of said base that extends laterally beyond each of the compartments.

5. The planter, as set forth in claim 1, further including one of a lip and at least one support member integrally formed with said base.

6. The planter, as set forth in claim 5, wherein said lip extends upwardly from said base and said at least one support member includes a bottom edge for engaging a surface and elevating said base from said surface.

7. The planter, as set forth in claim 5, wherein said at least one support member includes a perimeter support member that extends around a perimeter of said base.

8. The planter, as set forth in claim 5, wherein one of a lip, base, and support member is undulated.

9. The planter, as set forth in claim 5, further including a plurality of tabs integrally formed with said one of a base, lip, and at least one support member wherein said plurality of tabs is adapted to retain a piece of sheet material having scenery or other indicia printed thereon.

10. The planter, as set forth in claim 1, wherein said base is undulated.

11. The planter, as set forth in claim 1, wherein each said receptacle has a volume of less than about two cubic inches.

12. The planter, as set forth in claim 1, wherein each said compartment has a shape and cross-section.

13. The planter, as set forth in claim 12, wherein said shape is selected from a group consisting of a bowl, cone, frustum, and cylinder shape and said cross-section is selected from a group consisting of a circular, triangular, oval, and square cross-section.

14. The planter, as set forth in claim 1, wherein each said compartment has an exterior wall conjoined with an exterior wall of at least one other compartment.

15. The planter, as set forth in claim 14, further including a fillet disposed at each point of conjunction between the compartments.

16. The planter, as set forth in claim 1, wherein the compartments vary in height as measured from an upper surface of the base.

17. The planter, as set forth in claim 16, wherein the variation in compartment height ranges from about 0.25 inches to about three inches.

18. The planter, as set forth in claim 1, further including a plant-growing medium disposed in at least one of said receptacles.

19. The planter, as set forth in claim 18, further including one of a plant and plant seed being propagated in said plant-growing medium.

20. The planter, as set forth in claim 19, wherein said one of a plant and plant seed is a species of cactus.

21. The planter, as set forth in claim 1, wherein the planter is painted with droplets of paint.

22. The planter, as set forth in claim 1, wherein the planter is molded as a unitary article.

23. The planter, as set forth in claim 22, wherein the planter is molded from a material having a visual appearance.

24. The planter, as set forth in claim 23, wherein said visual appearance of said material is selected from a group consisting of a clear, translucent, colored, multi-colored, and glow-in-the-dark material.

25. The planter, as set forth in claim 22, wherein the planter is molded by a process selected from a group consisting of a blow molding and injection molding process.

26. The planter, as set forth in claim 22, wherein said material is a polymer selected from a group consisting of a copolymer, polystyrene, alkyl benzene, sulfonate (ABS), polyethylene, and polypropylene polymer.

27. The planter, as set forth in claim 1, further including a detachable cover capable of being attached to the planter.

28. The planter, as set forth in claim 1, further including an elevated planter having a bottom wall and side walls extending upwardly from the bottom wall so as to define an elevated receptacle, the elevated planter coupled to an exterior wall of one of the compartments such that at least a portion of the bottom wall of the elevated planter is elevated above the base.

29. The planter, as set forth in claim 1, wherein the base has a front portion and a rear portion and the compartments increase in height from the front portion of the base portion to the rear portion of the base portion.

30. The planter, as set forth in claim 29, wherein the base portion has an arcuate shape and the front portion is a radially inner projecting portion of the arcuate shape base portion and the rear portion is a radially outer projecting portion of the arcuate base portion.

* * * * *